May 17, 1927.  E. A. SPERRY  1,629,236
MEANS FOR INDICATING LOSS OF SYNCHRONISM IN TRANSMISSION SYSTEMS
Filed Aug. 12, 1920
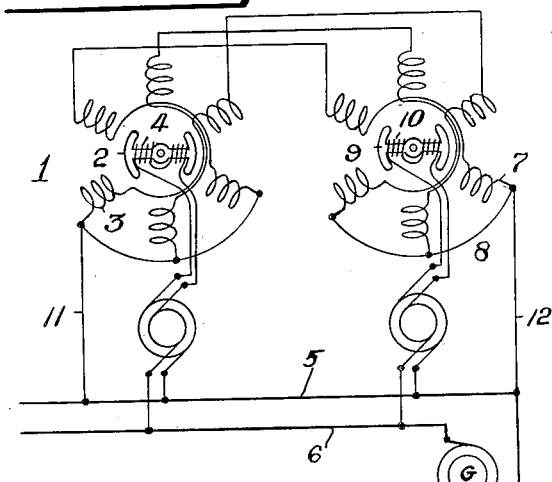
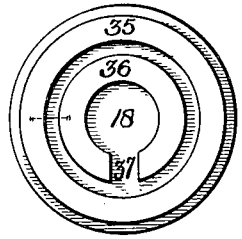
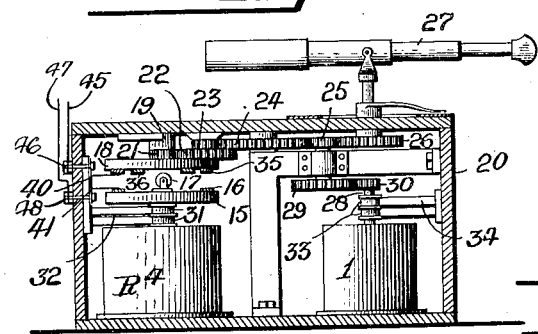
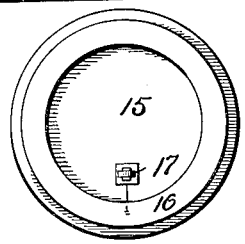
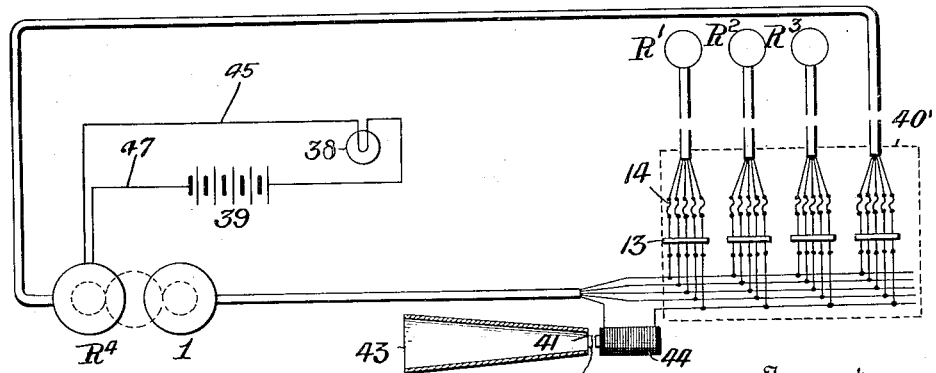
Inventor
ELMER A. SPERRY.
By his Attorney
Herbert H. Thompson Patented May 17, 1927.

1,629,236

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

MEANS FOR INDICATING LOSS OF SYNCHRONISM IN TRANSMISSION SYSTEMS.

Application filed August 12, 1920. Serial No. 403,049.

This invention relates to transmission systems comprising a transmitter and one or more repeater motors electrically connected therewith for indicating at one or more distant points the angular positions of an object connected for driving the transmitter. In alternating current transmission systems such as disclosed in the application of E. A. Sperry and E. A. Sperry, Jr., Serial No. 372,809, filed April 10, 1920, for "self synchronous transmission systems", it is found that the failure for one reason or another of one repeater to move in synchronism with the transmitter prevents the other repeaters from moving in synchronism with said transmitter and thus throws the entire system out of proper working order. The repeater motors are usually located at different points, with the result that if one repeater should become stuck while the transmission system is in operation and thereby throw the other repeaters out of synchronism, any one reading one of the last mentioned repeaters would be unaware that it was out of synchronism unless he were informed of the stoppage of the first mentioned repeater.

The chief object of my invention is to provide simple and reliable means for automatically giving an indication whenever one or more repeater motors become out of synchronism with the transmitter. By the means which I have provided the falling of the repeater motors out of synchronism with the transmitter results automatically in a signal to indicate that the transmission system is not functioning properly.

Referring to the drawings wherein I have shown what I now consider to be the preferred form of my invention:

Fig. 1 is a wiring diagram of one form of transmission system to which my invention may be applied.

Fig. 2 is an elevation, partly in section, showing a transmitter and a repeater motor in combination with means for indicating when the repeater motors of the system are out of synchronism with the transmitter.

Fig. 3 is a diagrammatic view showing the general arrangement of the parts of the transmission system together with the indicating means.

Figs. 4 and 5 are views of details.

In Fig. 1 I have shown one type of alternating current transmission system to which my invention may be applied. This system is disclosed fully in the application of E. A. Sperry and E. A. Sperry, Jr., above referred to, and includes a transmitter 1 comprising a rotatable armature 2 and a stator or field 3. The armature 2 is shown provided with a winding 4 connected to single-phase alternating current mains 5, 6. The stator or field 3 consists of three pairs of field coils connected together at one end and at their other ends connected to similar field coils of the stator or field 7 of a repeater motor 8. The said repeater motor is of the same construction as the transmitter and includes a rotatable armature 9 provided with a winding 10 connected to mains 5 and 6. The ends of the pairs of coils or field 7 opposite to those connected with the coils of field 3 are connected together. Conductors 11 and 12 may connect the interconnected field coils of transmitter 1 and repeater 8 respectively with one of the A. C. mains, thereby providing a common return for the current in the stator field coil system.

The operation of the above described transmitter-repeater system will be readily understood by those skilled in the art. When the transmitter armature 2 moves with relation to the repeater armature 9, currents are induced in the field windings, and the armature 9 will take up a position corresponding to that of armature 1 wherein the armatures of the transmitter and repeater occupy the same positions relatively to their stator windings, and in which equal but opposing E. M. F.'s are induced in said windings. The repeater armature thus follows or reproduces the movement of the transmitter armature.

It will be obvious that any desired number of repeater motors may be connected in the above described transmission system. Thus in Fig. 3 I have shown four repeaters $R_1$, $R_2$, $R_3$, and $R_4$ connected with transmitter 1. Five conductors are shown extending from transmitter 1 with which are connected five conductors from each repeater, two of each group of said repeater conductors leading to the armature winding of the corresponding repeater and three to the stator field coils as will readily be understood in connection with Fig. 1. Suitable switches 15 and fuses 14 may be interposed in the connections between the repeater motors and the transmitter, said switches and fuses being shown positioned on a suitable switchboard 40'.

If for any reason one of the repeater motor armatures should become stuck or should fail to move in synchronism with the transmitter armature it will readily be seen that the E. M. F. induced in the stator windings of said repeater will react upon the armatures of the other repeater motors to throw said armatures out of synchronism with the transmitter. In order to notify the operator when the repeaters are out of step with the transmitter I have provided means comprising an element driven by the transmitter and an element driven by a repeater for automatically giving a signal when the repeater becomes out of synchronism with the transmitter. Such means may take the form shown in Figs. 2, 4, and 5 and may be constructed substantially as follows:

Rotatable with the armature of repeater motor $R_4$, as by being mounted on the shaft of said armature, is an element 15, which may be of insulating material, carrying on its upper face an annular contact 16 to which is electrically connected a brush or trolley 17 as shown clearly in Fig. 4. Mounted above element 15 is a second rotatable element 18 driven at the same rate as the armature of transmitter 1. In the embodiment shown the member 18 is rotatably mounted in a bracket 19 carried within a suitable casing 20 and is driven through gearing 21—26 from a sighting instrument 27. The latter drives shaft 28 of the armature of transmitter 1 through gearing 26, 25, 29, 30 at the same rate as element 18. Of course, while, for purposes of illustration, I have shown transmitter 1 as driven by a sighting instrument it is obvious that the transmitter may be driven by any of a wide variety of elements or instruments, the angular position of which is to be transmitted. For illustrative purposes I have shown transmitter 1 and repeater $R_4$ within a common casing 20, though this arrangement is, of course, not necessary to the successful operation of my invention. Suitable slip rings 31 and brushes 32 may be provided to lead current to the armature of repeater $R_4$ and slip rings 33 and brushes 34 may be provided for a similar purpose in connection with transmitter 1.

Element 18 may be of insulating material and is shown (see Fig. 5) as provided on its under face with an annular contact 35 to which is electrically connected a second contact 36 concentric with contact 35 and also carried by element 18. Contact 36 is provided with a gap 37 of a size just sufficient to prevent engagement by trolley 17 with contact 36 when said trolley lies opposite said gap. Trolley 17 is so positioned on element 15 that it either lies opposite gap 37 or engages contact 36, depending upon the relative positions of elements 15 and 18. In Fig. 2 contacts 16, 35, and 36 are shown in diametrical section for the sake of clearness. From the arrangement shown it will be evident that when trolley 17 is once positioned opposite gap 37 said trolley will remain opposite said gap as long as transmitter 1 and repeater $R_4$ remain in synchronism. If, however, synchronism between said repeater and transmitter should be lost, trolley 17 will immediately engage contact 36.

For giving a signal when trolley 17 engages contact 36 I have shown an electric lamp 38 connected at one terminal with a battery 39. The other terminal 45 of the lamp may be connected through binding post 46 and brush 40 (see also Fig. 2) with contacts 35 and 36 while the other terminal 47 of battery 39 may be connected through binding post 48 (Fig. 2) brush 41 with contact 16 and trolley 17. Thus, whenever trolley 17 engages contact 36 a circuit will be closed through lamp 38. Of course any of a wide variety of electrical signalling means may be used in place of lamp 38 and the latter is shown merely for purposes of illustration. The lamp 38 may be located at any convenient point so that it may be readily and conveniently observed.

In Fig. 3 I have shown a signalling means in the form of a resonator which may be used in addition to or alternatively with lamp 38. A diaphragm 41' provided with an armature 42 is shown positioned at the base of a horn or megaphone 43. A solenoid or electromagnet 44 is connected in the field circuit of the transmission system and is located adjacent armature 42 in position to attract said armature. As long as the transmitters and repeaters are in synchronism diaphragm 41' is not vibrated sufficiently by magnet 44 to produce any noticeable sound. When, however, the current in the transmission system is disturbed by the "sticking" or falling out of synchronism of a repeater, the diaphragm 41' is vibrated at a much more rapid rate so that a decidedly noticeable audible signal is produced.

The operation of my invention will be readily understood in view of the foregoing description. With transmitter 1 and the repeater motors in synchronism and trolley 17 positioned opposite gap 37 said trolley will remain opposite said gap as long as said repeaters and transmitter remain in synchronism since elements 15 and 18 will be driven at equal rates of speed. If, however, any repeater motor should "stick" or drop out of synchronism with the transmitter, the other repeaters, including repeater $R_4$, will fall out of synchronism with said transmitter and element 15 will no longer move at the same rate as element 18. Trolley 17 will thereupon engage contact 36 and a circuit will be closed through lamp 38. At the same time, if the resonator comprising diaphragm 41' and magnet 44 is employed, an audible signal will be given as above mentioned. The operator or operators of the system will thus be notified that the system is not functioning properly and the repeater responsible for the loss of synchronism may be located and thrown out of circuit by means of the appropriate switch 13.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a self-synchronous A. C. transmission system, a transmitter, a repeater in circuit with said transmitter whereby said transmitter controls said repeater and means for indicating the loss of synchronism between said transmitter and said repeater, said means including a pair of cooperating members, means whereby one of said members is mechanically connected to said transmitter, a second repeater in circuit with said transmitter, and means whereby said second member is actuated by said second repeater.

2. In a self-synchronous A. C. transmission system, a transmitter, a plurality of repeaters in circuit with said transmitter, means for indicating loss of synchronism between said transmitter and any of said repeaters, and means whereby said first means is actuated by said transmitter and by one of said repeaters.

3. In a self-synchronous A. C. transmission system, a transmitter, a plurality of repeaters in circuit with said transmitter, means for indicating loss of synchronism between said transmitter and one of said repeaters, and means whereby said first means is actuated by the transmitter and another of said repeaters.

4. In a self-synchronous A. C. transmission system, a transmitter, a plurality of repeaters in circuit with said transmitter and means for indicating loss of synchronism between said repeaters and said transmitters, said means including a pair of cooperating members, means whereby one of said members is actuated by said transmitter, and means whereby the other of said members is actuated by one of said repeaters.

5. In a self-synchronous A. C. transmission system, a transmitter, a plurality of repeaters in circuit with said transmitter, circuit-closing means for indicating loss of synchronism between said transmtitter and one of said repeaters, said means including a pair of cooperating contacts, means whereby said transmitter actuates one of said contacts, and means whereby another of said repeaters actuates the other of said contacts.

6. In a self-synchronous A. C. transmission system, a transmitter, a plurality of repeaters in circuit with said transmitter, means for indicating loss of synchronrsm between said transmitter and one of said repeaters, and means whereby said first means is actuated by another of said repeaters.

7. In a self-synchronous A. C. transmission system, a transmitter, a plurality of repeaters in circuit with said transmitter, and means for indicating loss of synchronism between one of said repeaters and said transmitter, said means including a pair of cooperating members, means whereby one of said members is actuated by said transmitter, and means whereby the other of said members is actuated by another of said repeaters.

In testimony whereof I have affixed my signature.

ELMER A. SPERRY.